US010618994B2

(12) United States Patent
Yan et al.

(10) Patent No.: US 10,618,994 B2
(45) Date of Patent: Apr. 14, 2020

(54) FUNCTIONAL INITIATOR FOR ANIONIC POLYMERIZATION

(71) Applicant: Bridgestone Corporation, Chuo-ku (JP)

(72) Inventors: Yuan-Yong Yan, Copley, OH (US); David M. Roggeman, North Royalton, OH (US)

(73) Assignee: Bridgestone Corporation, Chuo-ku (JP)

( * ) Notice: Subject to any disclaimer, the term of this patent is extended or adjusted under 35 U.S.C. 154(b) by 160 days.

(21) Appl. No.: 15/775,685

(22) PCT Filed: Oct. 8, 2016

(86) PCT No.: PCT/US2016/056199
§ 371 (c)(1),
(2) Date: May 11, 2018

(87) PCT Pub. No.: WO2017/083035
PCT Pub. Date: May 18, 2017

(65) Prior Publication Data
US 2018/0371140 A1 Dec. 27, 2018

Related U.S. Application Data

(60) Provisional application No. 62/255,151, filed on Nov. 13, 2015.

(51) Int. Cl.
| | |
|---|---|
| *C08F 236/10* | (2006.01) |
| *B01J 27/24* | (2006.01) |
| *C08F 236/06* | (2006.01) |
| *C08K 5/56* | (2006.01) |
| *C08C 19/44* | (2006.01) |
| *C08C 19/22* | (2006.01) |
| *C08C 19/25* | (2006.01) |
| *B60C 1/00* | (2006.01) |
| *B60C 11/00* | (2006.01) |
| *C08F 212/08* | (2006.01) |
| *C08K 3/36* | (2006.01) |
| *C08L 9/06* | (2006.01) |
| *B01J 31/02* | (2006.01) |
| *B01J 31/12* | (2006.01) |
| *C08F 36/08* | (2006.01) |
| *C08F 236/08* | (2006.01) |
| *C08F 236/04* | (2006.01) |

(52) U.S. Cl.
CPC .......... *C08F 236/06* (2013.01); *B60C 1/0016* (2013.01); *B60C 11/0008* (2013.01); *C08C 19/22* (2013.01); *C08C 19/25* (2013.01); *C08C 19/44* (2013.01); *C08F 212/08* (2013.01); *C08F 236/10* (2013.01); *C08K 3/36* (2013.01); *C08K 5/56* (2013.01); *C08L 9/06* (2013.01); *B01J 27/24* (2013.01); *B01J 31/0237* (2013.01); *B01J 31/0275* (2013.01); *B01J 31/122* (2013.01); *C08F 36/08* (2013.01); *C08F 236/04* (2013.01); *C08F 236/08* (2013.01)

(58) Field of Classification Search
CPC ........ C08F 36/06; C08F 36/08; C08F 236/04; C08F 236/06; C08F 236/08; C08F 236/10; B01J 27/24; B01J 31/0237; B01J 31/0275
See application file for complete search history.

(56) References Cited

U.S. PATENT DOCUMENTS

| | | |
|---|---|---|
| 5,238,893 A | 8/1993 | Hergenrother et al. |
| 5,329,005 A | 7/1994 | Lawson et al. |
| 5,502,130 A * | 3/1996 | Lawson ............... C07F 1/02 526/180 |
| 5,523,364 A | 6/1996 | Engel et al. |
| 5,527,753 A | 6/1996 | Engel et al. |
| 5,723,533 A | 3/1998 | Lawson et al. |
| 6,084,025 A | 7/2000 | Kitamura et al. |
| 6,121,474 A | 9/2000 | Schwindeman et al. |
| 6,184,338 B1 | 2/2001 | Schwindeman et al. |
| 6,515,087 B2 | 2/2003 | Hsu et al. |
| 6,610,859 B1 | 8/2003 | Brockmann et al. |
| 6,720,391 B2 | 4/2004 | Schwindeman et al. |
| 8,227,562 B2 | 7/2012 | Yan et al. |
| 8,362,164 B2 | 1/2013 | Yan |
| 9,365,660 B2 | 6/2016 | Yan et al. |
| 2015/0141582 A1 | 5/2015 | Yan et al. |

OTHER PUBLICATIONS

Unkelbach, C. et al. "Direct benzylic metalation of a phenethylamine derivative: potassium as the key to both generation and stabilization of a 'labile anion'". Chem. Commun., 2012, 48, 10612-10614. (Year: 2012).*
R.D. Sanderson et al., "The synthesis of a hydrocarbon-soluble organolithium anionic initiator. A gas-liquid chromatography study of the efficiency of the reaction of s-butyllithium with p-divinylbenzene," Polymer, 1999, 40, pp. 5429-5437 (Elsevier Science Ltd.; London, UK).
R.P. Quirk et al., "Recent Advances in Anionic Synthesis of Functionalized Elastomers Using Functionalized Alkyllithium Initiators," Rubber Chem. & Technol., 69(3), pp. 444-461 (1996; Rubber Division of Am. Chem. Soc, Akron, Ohio).
D.F. Lawson et al., Applications of Anionic Polymerization Research (R.P. Quirk, ed.), Ch. 6—"Anionic Polymerization of Dienes Using Homogeneous Lithium Amide (N—Li) Initiators, and Determination of Polymer-Bound Amines," pp. 77-87 (1998; American Chemical Society, Washington, DC).

(Continued)

*Primary Examiner* — Richard A Huhn
(74) *Attorney, Agent, or Firm* — Meredith E. Hooker; David G. Burleson

(57) ABSTRACT

An ethylenically unsaturated polymer includes at a terminus the radical of a compound that is the reaction product of a secondary amine and a vinyl aromatic compound. The secondary amine portion of the compound can be a cyclic compound with N as one of its ring atoms, while the vinyl aromatic compound can include one or more substituents. The polymer can be used as a component of a variety of elastomeric compounds used in the production of vulcanizates.

20 Claims, No Drawings

(56) References Cited

OTHER PUBLICATIONS

CNIPA action in CN appl. No. 201680076218.2, dated Feb. 20, 2019.
G.L. Closs, "Carbenes from Alkyl Halides and Organolithium Compounds. IV. Formation of Alkylcarbenes from Methylene Chloride and Alkyllithium Compounds," J. Am. Chem. Soc. 84(5), pp. 809-813 (1962; Am. Chem. Society; Washington, DC).
EPO action in EP appl. No. 16864734.5, dated Jul. 23, 2019.

* cited by examiner

FUNCTIONAL INITIATOR FOR ANIONIC POLYMERIZATION

CROSS-REFERENCE TO RELATED APPLICATION

This application is a national stage entry of international application no. PCT/US2016/056199, filed 8 Oct. 2016, which claims the benefit of U.S. provisional patent application No. 62/255,151, filed 13 Nov. 2015, the disclosure of which is incorporated herein by reference.

BACKGROUND INFORMATION

Rubber goods such as tire treads often are made from elastomeric compositions that contain one or more reinforcing materials such as, for example, particulate carbon black and silica; see, e.g., *The Vanderbilt Rubber Handbook,* 13th ed. (1990), pp. 603-04.

Good traction and resistance to abrasion are primary considerations for tire treads; however, motor vehicle fuel efficiency concerns argue for a minimization in their rolling resistance, which correlates with a reduction in hysteresis and heat build-up during operation of the tire. These considerations are, to a great extent, competing and somewhat contradictory: treads made from compositions designed to provide good road traction usually exhibit increased rolling resistance and vice versa.

Filler(s), polymer(s), and additives typically are chosen so as to provide an acceptable compromise or balance of the desired properties. Ensuring that reinforcing filler(s) are well dispersed throughout the elastomeric material(s) both enhances processability and acts to improve physical properties. Dispersion of filler particles can be improved by increasing their interaction with the elastomer(s) and/or decreasing their interaction with each other. Examples of efforts of this type include high temperature mixing in the presence of selectively reactive promoters, surface oxidation of compounding materials, and surface grafting.

The section of a polymer chain from the site of the last crosslink to an end of the polymer chain is a major source of hysteretic losses; this free end is not tied to the macromolecular network and thus cannot be involved in an efficient elastic recovery process and, as a result, energy transmitted to this section of the polymer (and vulcanizate in which such polymer is incorporated) is lost as heat. Ensuring that these polymer chain ends are tied to, or otherwise interact well with, reinforcing particulate fillers, is important to many vulcanizate physical properties such as, for example, reduced hysteresis.

Chemically modifying the polymer, typically at a terminus thereof, is one of the most effective ways of increasing interactivity of fillers and polymers. Terminal chemical modification often occurs by reaction of a living polymer with a functional terminating agent. Some of the numerous examples of this approach include U.S. Pat. Nos. 3,109,871, 4,647,625, 4,677,153, 5,109,907, 6,977,281, etc., as well as references cited therein and later publications citing these patents. Some of the most commonly employed synthetic elastomeric materials used in the manufacture of vulcanizates such as tire components include high-cis polybutadiene, often made by processes employing catalysts, and substantially random styrene/butadiene interpolymers, often made by processes employing anionic initiators. Post-polymerization terminal functionalization that can be performed with anionically initiated polymers often cannot be performed on coordination catalyzed polymers and, to a lesser extent, vice versa.

Terminal modification also can be provided by means of a functional initiator, in isolation or in combination with functional termination. Functional initiators typically are organolithium compounds that additionally include functionality, typically functionality that includes a nitrogen atom, capable of interacting with one or more types of particulate filler materials. Many of these functional initiators have relatively poor solubility in hydrocarbon solvents of the type commonly used in anionic (living) polymerizations, and many do not maintain propagation of living ends as well as more common alkyllithium initiators such as n-butyllithium. Both of these characteristics can negatively impact polymerization rate and efficiency.

This degradation in the ability to propagate living ends can be countered somewhat by conducting polymerizations at lower temperatures, i.e., less than 100° C., often less than 90° C. or even 80° C. Such temperature control is not always possible or practical, however, particularly when a continuous or semi-continuous polymerization process is desired.

Functional initiators that retain good initiation performance in anionic polymerizations conducted at elevated temperatures remain desirable.

SUMMARY

Provided herein is an anionic polymerization method for providing ethylenically unsaturated polymers. The method employs a functional initiator which efficiently propagates living ends at temperatures such as those employed in continuous or semi-continuous processes (e.g., at least 100° C.).

In one aspect is provided an initiating compound having the general formula

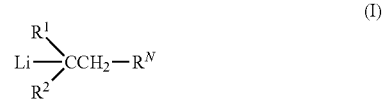

(I)

where $R^1$ is a substituted or unsubstituted aryl group, $R^2$ is $R^1$, a hydrogen atom, or a substituted or unsubstituted (cyclo)alkyl group, and $R^N$ is the radical of a secondary amine group. Each of $R^1$ and $R^2$ is free of active hydrogen atom-containing groups. (The presence of active hydrogen atoms is indicated by the Zerewitinoff determination method.) Although the Li atom in general formula (I) is shown as being covalently bonded to the benzylic C atom, that bond might be ionic.

Initiating compounds such as those defined by general formula (I) can be provided by reacting a lithiated secondary amine with a vinyl aromatic compound defined by the general formula

(II)

where $R^1$ and $R^2$ are defined as above. The N atom of the secondary amine involved in the foregoing reaction can be bonded to two hydrocarbyl groups or can be part of a cyclic group having 5 to 8 ring atoms, one or more ring atoms of which can include a substituent.

Also provided is a polymer that includes a radical of a general formula (I) compound at its terminus. Some embodiments of the resulting polymer, in a carbanionic form, can be represented the general formula

(III)

where $R^1$, $R^2$ and $R^N$ are defined as above and $\pi^*$ is a carbanionic polymer chain that includes ethylenic unsaturation, i.e., ethylenically unsaturated mer.

The polymer can be prepared from ethylenically unsaturated monomers, typically including one or more types of polyene, optionally further including one or more types of vinyl aromatic compounds. In certain embodiments, the polyene(s) can be conjugated dienes, and the resulting conjugated diene mer can incorporated substantially randomly along the polymer chain. In these and other embodiments, the polymer can be substantially linear.

The polymer optionally can be provided with terminal functionality (in addition to that provided by the initiator radical) by reaction with a terminating compound, coupling agent or linking agent.

The polymer can interact with particulate filler such as, but not limited to, carbon black. Compositions, including vulcanizates, that include particulate fillers and such polymers also are provided, as are methods of providing and using such compositions.

Methods of providing this polymer, regardless of how characterized, also are provided.

Other aspects of the present invention will be apparent to the ordinarily skilled artisan from the detailed description that follows. To assist in understanding that description, certain definitions are provided immediately below, and these are intended to apply throughout unless the surrounding text explicitly indicates a contrary intention:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —CH$_2$CH$_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetra-polymers, and the like;

"random interpolymer" means an interpolymer having mer units derived from each type of constituent monomer incorporated in an essentially non-repeating manner and being substantially free of blocks, i.e., segments of three or more of the same mer;

"gum Mooney viscosity" is the Mooney viscosity of an uncured polymer prior to addition of any filler(s);

"compound Mooney viscosity" is the Mooney viscosity of a composition that includes, inter alia, an uncured or partially cured polymer and particulate filler(s);

"substituted" means one containing a heteroatom or functionality (e.g., hydrocarbyl group) that does not interfere with the intended purpose of the group in question;

"directly bonded" means covalently attached with no intervening atoms or groups;

"polyene" means a molecule with at least two double bonds located in the longest portion or chain thereof, and specifically is inclusive of dienes, trienes, and the like;

"polydiene" means a polymer that includes mer units from one or more dienes;

"phr" means parts by weight (pbw) per 100 pbw rubber;

"radical" or "residue" means the portion of a molecule that remains after reacting with another molecule, regardless of whether any atoms are gained or lost as a result of the reaction;

"aryl group" means a phenyl group or a polycyclic aromatic radical;

"ring structure" means a cyclic group;

"terminus" means an end of a polymeric chain;

"terminal moiety" means a group or functionality located at a terminus; and

"reactive polymer" means a polymer having at least one site which, because of the presence of an active terminus, readily reacts with other molecules, with the term being inclusive of, inter alia, carbanionic polymers.

Throughout this document, all values given in the form of percentages are weight percentages (w/w) unless the surrounding text explicitly indicates a contrary intention. The relevant teachings of all patent documents mentioned throughout are incorporated herein by reference.

DETAILED DESCRIPTION

As apparent from the foregoing, polymers provided according to the present method can be described or characterized in a variety of ways.

The polymer can be provided by a process in which a general formula (I) compound is used to initiate anionic (living) polymerization of one or more types of unsaturated monomers. The polymer desirably can include polyene mer, particularly diene mer units and more particularly conjugated diene mer, and optionally vinyl aromatic mer units.

The polymer can be elastomeric and can include mer units that include unsaturation. Unsaturated mer can result from incorporation of polyenes, particularly dienes and trienes (e.g., myrcene). Illustrative polyenes include $C_4$-$C_{12}$ dienes, particularly conjugated dienes such as, but not limited to, 1,3-butadiene, isoprene, 1,3-pentadiene, 2,3-dimethyl-1,3-butadiene, and 1,3-hexadiene.

Polyenes can incorporate into polymeric chains in more than one way. Especially for polymers targeted for tire tread applications, controlling this manner of incorporation can be desirable. Techniques for achieving this control are discussed below.

A polymer chain with an overall 1,2-microstructure, given as a numerical percentage based on total polyene content, of from ~10 to ~80%, optionally from ~25 to 65%, can be desirable for certain end use applications. A polymer that has an overall 1,2-microstructure of no more than ~50%, preferably no more than ~45%, more preferably no more than ~40%, even more preferably no more than ~35%, and most preferably no more than ~30%, based on total polyene content, is considered to be "substantially linear."

Directly bonded pendent aromatic groups can be provided by mer units derived from vinyl aromatics, particularly the $C_8$-$C_{20}$ vinyl aromatics such as, e.g., styrene, α-methyl styrene, p-methyl styrene, the vinyl toluenes, the vinyl naphthalenes, and the like. When used in conjunction with one or more polyenes, mer units with pendent aromaticity can constitute from ~1 to ~50%, from ~10 to ~45%, or from ~20 to ~35%, of the polymer chain. The microstructure of such interpolymers can be random, i.e., the mer units derived from each type of constituent monomer do not form blocks and, instead, are incorporated in an essentially non-repeating manner. Random microstructure can provide particular benefit in some end use applications such as, e.g., rubber compositions used in the manufacture of tire treads.

Exemplary elastomers include interpolymers of one or more polyenes and styrene such as, e.g., poly(styrene-co-butadiene), also known as SBR.

The foregoing types of polymers can be made by emulsion polymerization or solution polymerization, with the latter affording greater control with respect to such properties as randomness, microstructure, etc. Solution polymerizations have been performed since about the mid-20th century, so the general aspects thereof are known to the ordinarily skilled artisan; nevertheless, certain aspects are provided here for convenience of reference.

Both polar solvents, such as THF, and non-polar solvents can be employed in solution polymerizations, with the latter type being more common in industrial practice. Examples of non-polar solvents typically employed in anionically initiated solution polymerizations include various $C_5$-$C_{12}$ cyclic and acyclic alkanes as well as their alkylated derivatives, certain liquid aromatic compounds, and mixtures thereof. The ordinarily skilled artisan is aware of other useful solvent options and combinations.

In solution polymerizations, both randomization and vinyl content (i.e., 1,2-microstructure) can be increased by the inclusion in the polymerization ingredients of a coordinator, usually a polar compound. Up to 90 or more equivalents of coordinator per equivalent of initiator can be used, with the amount depending on, for example, the amount of vinyl content desired, the level of non-polyene monomer employed, the reaction temperature, and nature of the specific coordinator employed. Compounds useful as coordinators include organic compounds that include a heteroatom having a non-bonded pair of electrons, particularly O or N. Examples include dialkyl ethers of mono- and oligo-alkylene glycols; crown ethers; tertiary amines such as tetramethylethylene diamine; THF; THF oligomers; linear and cyclic oligomeric oxolanyl alkanes (see, e.g., U.S. Pat. No. 4,429,091) such as 2,2-bis(2'-tetrahydrofuryl)propane, dipiperidyl ethane, hexamethylphosphoramide, N,N'-dimethylpiperazine, diazabicyclooctane, diethyl ether, tributylamine, and the like.

Although the ordinarily skilled artisan understands the conditions typically employed in solution polymerizations, a representative description is provided for convenience of the reader. The following is based on a batch process, although extending this description to semi-batch or continuous processes is within the capability of the ordinarily skilled artisan. Depending on the nature of the polymer desired, the particular conditions of the solution polymerization can vary significantly.

Anionic polymerizations typically employ an alkyllithium initiator, such as n-butyllithium; a so-called multifunctional initiator, which is capable of forming polymers with more than one living end; or a functionalized initiator, many of which are poorly soluble in the types of solvents set forth above and/or unable to maintain good propagation of live ends.

Advantageously, the functional initiators described herein are both soluble in the types of organic liquids commonly employed as solvents in solution polymerizations and can maintain propagation of live ends at the types of elevated temperatures encountered in continuous and semi-continuous processes.

A general formula (I)-type compound can be provided by reacting a lithiated secondary amine with a vinyl aromatic compound defined by general formula (II).

Lithiated secondary amines can be provided readily by introducing a secondary amine to a source of Li cations under anhydrous and anaerobic conditions. If the secondary amine is not a liquid, it can be dissolved or suspended in an organic liquid similar to those discussed above, preferably one that is the same or compositionally similar to that to be employed in the polymerization.

Given the foregoing solubility considerations, alkyllithium compounds such as, for example, n-butyllithium, constitute a convenient Li source.

Exemplary secondary amines include those where the N atom of the secondary amine group is bonded to two hydrocarbyl groups, for example, alkyl, cycloalkyl, aryl, aralkyl, and alkaryl. The hydrocarbyl groups can be the same (e.g., two alkyl groups) or different. One or both of the hydrocarbyl groups can be substituted, as long as the substituent(s) do not include any active hydrogen atoms. A non-limiting example of a secondary amine that includes a substituted hydrocarbyl group is N,N,N'-trimethylethylenediamine.

Other exemplary secondary amines include those where the N atom of the secondary amine group is part of a cyclic group having 5 to 8, often 5 to 7, ring atoms, i.e., pyrrolidine, piperidine, and hexamethyleneimine (HMI). One or more of the ring carbon atoms of the cyclic group can include a hydrocarbyl group, for example, an alkyl, cycloalkyl, aryl, aralkyl, or alkaryl group. Where more than one hydrocarbyl group is present, the two groups need not be identical. The hydrocarbyl group(s) can be substituted, as long as the substituent(s) do not include any active hydrogen atoms. Tertiary amine groups, including those where the tertiary amine N atom is part of a cyclic group having 5 to 8, often 5 to 7, ring atoms, constitute a preferred class of substituent. Non-limiting examples of potentially useful substituents include substituted or unsubstituted $C_1$-$C_6$ alkyl groups, particularly dialkylaminoalkylene groups such as those resulting from attachment of N,N-dimethylethylamine and N,N-dimethylpropylamine; aryl groups, specific, non-limiting examples of which include

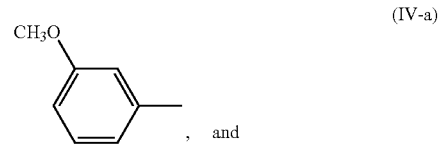

(IV-a)

, and

(IV-b)

;

a substituted or unsubstituted alkaryl group, specific examples of which include

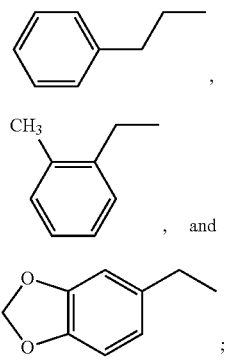

a substituted or unsubstituted cycloalkyl group, specific examples of which include

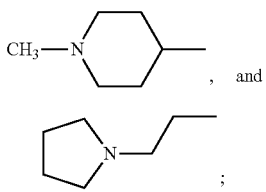

or even a group bonded through an amine N atom which is part of a cyclic group having 5 to 7 ring atoms, for example

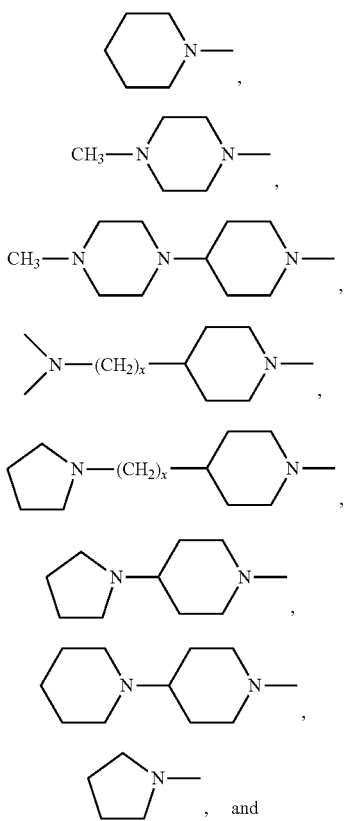

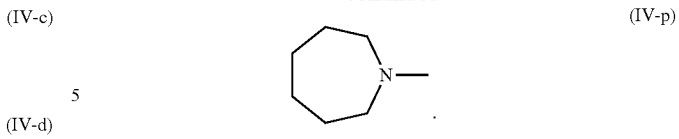

where x is an integer of from 1 to 6, preferably 2 to 4, inclusive. The specific compounds set forth in formulas (IV-a) to (IV-p) are sufficient to permit the ordinarily skilled artisan to envision a significant number of analogs and additional species.

Regardless of which secondary amine is chosen, a lithiated version is reacted with a vinyl aromatic compound defined by general formula (II). In addition to styrene ($R^1$=phenyl group, $R^2$=H), α-methylstyrene ($R^1$=phenyl group, $R^2$=$CH_3$), and 1,1-diphenylethylene ($R^1$=$R^2$=phenyl group), general formula (II) encompasses a multitude of substituted vinyl aromatic compounds, many of which are generically represented by the following formula with $R^1$ (from general formula (II)) being represented as a phenyl group, although this is merely exemplary,

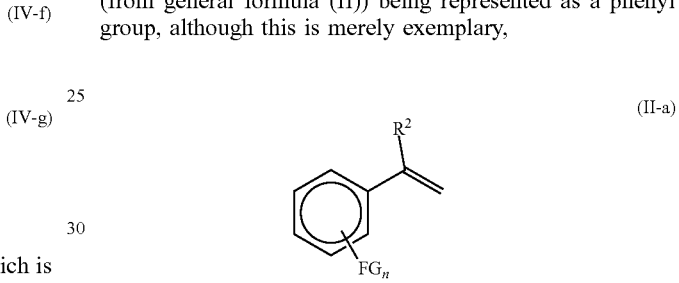

where $R^2$ is defined as above, FG is a functional group (substituent) and n is an integer of from 0 to 5, inclusive. Non-limiting examples of potential substituents (FG) include $R_2N-$, $R_2P-$, $R_3SiO-$, etc., with R representing a hydrocarbyl group such as those described previously, particularly a $C_1$-$C_{12}$ alkyl, $C_5$-$C_8$ cycloalkyl or aryl group, as well as heterocyclic moieties including pyrrolidinyl and piperidinyl groups. These examples are not to be considered limiting, and the ordinarily skilled artisan can envision numerous other such compounds that fall within the scope of general formulas (II) and (II-a).

Because of the reactivity of Li ions, the initiating compound cannot be made in the presence of ethylenically unsaturated monomers. The initiating compound can be made external to the polymerization vessel and then added thereto when polymerization is ready to be under-taken or by preparing it in the polymerization vessel prior to introduction of the monomeric compound(s) thereto.

A batch polymerization typically begins by charging a blend of monomer(s) and solvent to a suitable reaction vessel, at a temperature of from about −80° to ~100° C., more commonly from about −40° to ~50° C., and typically from ~0° to ~30° C. The solution then can be heated to a temperature of from about −70° to ~150° C., more commonly from about −20° to ~120° C., and typically from ~50° to ~100° C. A coordinator (if used) and initiator are added to the reaction vessel, often as part of a solution or blend. (Alternatively, the monomer(s) and coordinator can be added to the vessel after introduction of the initiator. The aforementioned temperature ranges are applicable to this alternative as well.)

The vessel contents typically are agitated to at least some degree, and the polymerization preferably is conducted under anaerobic conditions provided by an inert protective gas such as $N_2$, Ar or He. Polymerization pressure employed may vary widely, although typically a pressure of from ~0.1 to ~1 MPa is employed.

After the initiating compound and ethylenically unsaturated monomers are introduced, polymerization is allowed to proceed for a period of time sufficient to result in the formation of the desired functional polymer which, in batch processes, typically ranges from ~0.01 to ~100 hours, more commonly from ~0.08 to ~48 hours, and typically from ~0.15 to ~2 hours.

The polymerization temperature can vary widely, depending on a variety of factors, although polymerization vessel temperatures of from ~20° to ~90° C. are common, but temperatures up to ~130° C. are possible. Heat can be removed from the polymerization vessel by external cooling and/or evaporation of the monomer or solvent.

For a semi-batch process, the foregoing batch description is modified by metering, discontinuously or continuously, into the reaction vessel one or more of the ethylenically unsaturated monomers and/or the polar modifier(s). While the temperature ranges at which semi-batch processes typically are run are similar to those of batch processes, the lesser amounts of monomer being converted at any given time simplify heat transfer considerations and, accordingly, often are run at the higher ends of the various ranges. Additionally, metering of one or more of the types of monomers and/or polar modifiers can permit greater control of polymer microstructure.

For a continuous process, the batch process is modified by discontinuously or continuously metering into the reaction vessel all reactants and additives, i.e., the ethylenically unsaturated monomers, coordinator(s), initiator, and the like. The temperature ranges at which continuous processes typically are run tend to be similar to those of batch processes. Continuous processes typically are considered to be more efficient (production output) than batch or semi-batch processes. An exemplary continuous process is provided below in the examples. For additional information on such processes, the interested reader can refer to U.S. Pat. Nos. 7,442,748, 6,897,270, and 5,489,660, as well as patents and publications cited by and citing these patents.

After a desired degree of conversion has been reached, the heat source (if used) can be removed and, if the reaction vessel is to be reserved solely for polymerizations, the reaction mixture can be removed to a post-polymerization vessel for functionalization and/or quenching. At this point, the reaction mixture commonly is referred to as a "polymer cement" because of its relatively high concentration of polymer.

A quenched sample of the resulting polymer typically exhibits a gum Mooney viscosity ($ML_4$/100° C.) of from ~2 to ~150, more commonly from ~2.5 to ~125, even more commonly from ~5 to ~100, and most commonly from ~10 to ~75; the foregoing generally correspond to a number average molecular weight ($M_n$) of from ~5,000 to ~250,000 Daltons, commonly from ~10,000 to ~200,000 Daltons, more commonly from ~25,000 to ~150,000 Daltons, and most commonly from ~50,000 to ~125,000 Daltons. The resulting interpolymer typically has a molecular weight distribution ($M_w/M_n$, with $M_w$ representing weight average molecular weight) of from 1 to 10, commonly from 1.5 to 7.5, and more commonly from 2 to 5. (Both $M_n$ and $M_w$ can be determined by GPC using polystyrene standards for calibration and appropriate Mark-Houwink constants.)

The polymer is considered to include terminal functionality from the radical of the general formula (I) initiator; see general formula (III). However, where additional or other functionality is desired to enhance interaction with particulate filler, the polymer can be further functionalized by reaction with an appropriate functionalizing reagent, coupling agent and/or linking agent. The ordinarily skilled artisan is familiar with numerous examples of terminal functionalities that can be provided through this type of post-polymerization functionalization. For additional details, the interested reader is directed to any of U.S. Pat. Nos. 4,015,061, 4,616,069, 4,935,471, 5,153,159, 5,149,457, 5,196,138, 5,329,005, 5,496,940, 5,502,131, 5,567,815, 5,610,227, 5,663,398, 5,786,441, 6,812,295, 7,153,919, 7,816,483, 8,063,153, 8,183,326, 8,586,691, 8,642,706, 8,680,210 and 9,221,923, etc., as well as references cited in these patents and later publications citing these patents. Specific exemplary functionalizing compounds include $SnCl_4$, $R^3{}_3SnCl$, $R^3{}_2SnCl_2$, $R^3SnCl_3$, carbodiimides, N-cyclic amides, N,N'-disubstituted cyclic ureas, cyclic amides, cyclic ureas, isocyanates, Schiff bases, 4,4'-bis(diethylamino) benzophenone, alkyl thiothiazolines, alkoxysilanes (e.g., $Si(OR^3)_4$, $R^2Si(OR^3)_3$, $R^3{}_2Si(OR^3)_2$, etc.) cyclic siloxanes and mixtures thereof. (In the foregoing, each $R^3$ independently is a $C_1$-$C_{20}$ alkyl group, $C_3$-$C_{20}$ cycloalkyl group, $C_6$-$C_{20}$ aryl group, or $C_7$-$C_{20}$ aralkyl group.) Specific examples of preferred functionalizing compounds include $SnCl_4$, tributyl tin chloride, dibutyl tin dichloride, and 1,3-dimethyl-2-imidazolidinone (DMI).

Reaction of the foregoing types of compounds with a terminally active polymer can be performed in less than ~100 minutes, often fewer than ~50 minutes, at moderate temperatures, e.g., 0° to 75° C. Reaction typically occurs between a C atom of the polymer chain and a Si atom of the cyclic siloxane, silazane, etc. Because of the reactivity of carbanionic (living) polymers, the molar or equivalent amount of functionalizing compound need be no greater than essentially 1:1 relative to the amount of initiator employed in the polymerization, although lower and higher ratios certainly can be employed.

Quenching can be conducted by stirring the polymer and an active hydrogen-containing compound, such as an alcohol or acid, for up to ~120 minutes at temperatures of from ~25° to ~150° C.

The polymer product can be recovered from the polymerization mixture using known techniques. For example, a polymerization mixture can be passed through a heated screw apparatus, such as a desolventizing extruder, in which volatile substances (e.g., low boiling solvents and unreacted monomers) are removed by evaporation at appropriate temperatures (e.g., ~100° to ~170° C.) under no more than atmospheric pressure. Another option involves steam desolvation followed by drying the resulting polymer crumbs in a hot air tunnel. Yet another option involves recovering the polymer directly by drying the polymerization mixture on a drum dryer. Any of the foregoing can be combined with coagulation with water, alcohol or steam; if coagulation is performed, an elevated temperature drying technique may be desirable.

The resulting polymer can be utilized in a tread stock compound or can be blended with any conventionally employed tread stock rubber including natural rubber and/or non-functionalized synthetic rubbers such as, e.g., one or more of homo- and interpolymers that include just polyene-derived mer units (e.g., poly(butadiene), poly(isoprene), and copolymers incorporating butadiene, isoprene, and the like), SBR, butyl rubber, neoprene, EPR, EPDM, acrylonitrile/butadiene rubber (NBR), silicone rubber, fluoroelastomers, ethylene/acrylic rubber, EVA, epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from ~5 to ~99% of the total rubber, with the conventional rubber(s) making up the balance of the total rubber. The minimum amount depends to a significant extent on the degree of hysteresis reduction desired.

Amorphous silica ($SiO_2$) can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in *J. Am. Chem. Soc.*, vol. 60, p. 309 et seq.) is a recognized method for determining surface area. BET surface area of silicas generally is less than 450 $m^2/g$, and useful ranges of surface include from ~32 to ~400 $m^2/g$, ~100 to ~250 $m^2/g$, and ~150 to ~220 $m^2/g$.

The pH of the silica filler is generally from ~5 to ~7 or slightly over, preferably from ~5.5 to ~6.8.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J. M. Huber Corp. (Edison, N.J.).

Silica can be employed in the amount of ~1 to ~100 phr, preferably in an amount from ~5 to ~80 phr. The useful upper range is limited by the high viscosity that such fillers can impart.

Other useful fillers include all forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 $m^2/g$, preferably at least ~35 $m^2/g$, are preferred; surface area values can be determined by ASTM D-1765 using the CTAB technique. The carbon blacks may be in pelletized form or an unpelletized flocculent mass, although unpelletized carbon black can be preferred for use in certain mixers.

The amount of carbon black can be up to ~50 phr, with ~5 to ~40 phr being typical. When carbon black is used with silica, the amount of silica can be decreased to as low as ~1 phr; as the amount of silica decreases, lesser amounts of the processing aids, plus silane if any, can be employed.

Elastomeric compounds typically are filled to a volume fraction, which is the total volume of filler(s) added divided by the total volume of the elastomeric stock, of ~25%; accordingly, typical (combined) amounts of reinforcing fillers, i.e., silica and carbon black, is ~30 to ~100 phr.

When silica is employed as a reinforcing filler, addition of a coupling agent such as a silane is customary so as to ensure good mixing in, and interaction with, the elastomer(s). Generally, the amount of silane that is added ranges between ~4 and 20%, based on the weight of silica filler present in the elastomeric compound.

Coupling agents are compounds which include a functional group capable of bonding physically and/or chemically with a group on the surface of the silica filler (e.g., surface silanol groups) and a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the types of functionalities mentioned above. An exemplary coupling agent is bis[3-(triethoxysilyl)-propyl]tetrasulfide. One or more coupling agents can be added to the elastomeric (rubber) composition if desired, although the functionalized polymer of the present invention can be utilized in elastomeric compositions that do not include such coupling agents.

Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants also can be useful. The additional fillers can be utilized in an amount of up to ~40 phr, typically up to ~20 phr.

Other conventional rubber additives also can be added. These include, for example, process oils, plasticizers, antidegradants such as antioxidants and antiozonants, curing agents and the like.

All of the ingredients can be mixed using standard equipment such as, e.g., Banbury or Brabender mixers. Typically, mixing occurs in two or more stages. During the first stage (often referred to as the masterbatch stage), mixing typically is begun at temperatures of ~120° to ~130° C. and increases until a so-called drop temperature, typically ~165° C., is reached.

Where a formulation includes silica, a separate re-mill stage often is employed for separate addition of the silane component(s). This stage often is performed at temperatures similar to, although often slightly lower than, those employed in the masterbatch stage, i.e., ramping from ~90° C. to a drop temperature of ~150° C.

Reinforced rubber compounds conventionally are cured with about 0.2 to about 5 phr of one or more known vulcanizing agents such as, for example, sulfur or peroxide-based curing systems. For a general disclosure of suitable vulcanizing agents, the interested reader is directed to an overview such as that provided in Kirk-Othmer, *Encyclopedia of Chem. Tech.*, 3d ed., (Wiley Interscience, New York, 1982), vol. 20, pp. 365-468. Vulcanizing agents, accelerators, etc., are added at a final mixing stage. To ensure that onset of vulcanization does not occur prematurely, this mixing step often is done at lower temperatures, e.g., starting at ~60° to ~65° C. and not going higher than ~105° to ~110° C.

Certain tests have come to be recognized as correlating certain physical properties of vulcanizates with performance of products, particularly tire treads, made therefrom. For example, reductions in hysteresis (heat build-up during operation) have been found to correlate with higher rebound values and lower loss tangent values (tan δ) at high temperature, better handling performance often correlates with higher elastic modulus values at high temperature and strain, ice traction has been found to correlate with lower modulus values at low temperatures, etc. (In the foregoing, "high temperature" typically is considered to be ~50°-65° C. while "low temperature" is considered to be ~0° to −25° C.) Further, as a general rule, the lowest possible Δ tan δ generally is desirable.

Various embodiments of the present invention have been provided by way of example and not limitation. As evident from the foregoing descriptions, general preferences regarding features, ranges, numerical limitations and embodiments are to the extent feasible, as long as not interfering or incompatible, envisioned as being capable of being combined with other such generally preferred features, ranges, numerical limitations and embodiments.

The following non-limiting, illustrative examples provide the reader with detailed conditions and materials that can be useful in the practice of the present invention. These examples employ 1,3-butadiene as an exemplary polyene and styrene as an exemplary vinyl aromatic compound due to a variety of factors including cost, availability, ability to handle and, most importantly, ability to make internal comparisons as well as comparisons against previously reported polymers. The ordinarily skilled artisan can extend these examples to a variety of homo- and interpolymers.

EXAMPLES

In the batch polymerization examples, dried glass vessels previously sealed with extracted septum liners and perforated crown caps under a positive $N_2$ purge were used for all preparations. Butadiene solution (in hexane), styrene solution (33.5% in hexane), hexane, n-butyllithium (n-BuLi, 1.6 M solution in hexane), 2,2-bis(2'-tetrahydrofuryl)propane (1.6 M solution in hexane, stored over $CaH_2$), HMI (3.0 M solution in cyclohexane), 3-bis(trimethyl-silyl)aminopropylmethyldiethoxysilane (MA2E, 1.0 M solution in hexane), tin(IV) chloride (0.25 M solution in hexane), potassium t-amylate (KTA, 1.0 M solution in hexane) and butylated hydroxytoluene (BHT) solution in hexane were used.

Commercially available reagents and starting materials included the following, all of which used without further purification unless otherwise noted in a specific example:
from Sigma-Aldrich Co. (St. Louis, Mo.)—piperidine, N-(4-piperidino)piperidine and (3-glycidoxypropyl) trimethoxysilane (GLYMO, 4.5 M);
from Gelest Inc. (Morrisville, Pa.)—3-(1,3-dimethylbutylidene)aminopropyltri-ethoxysilane (AP3E, 3.0 M) and 2-(3,4-epoxycyclohexyl)ethyltrimethoxysilane (ECH3M; 4.3 M).

Each of the polymers in Examples 1-16 was targeted to include ~20 mole percent styrene mer and ~55% of total polyene mer incorporated in a 1,2-vinyl configuration. Each of the polymers in Examples 17-33 was targeted to include ~36 mole percent styrene mer and ~28% of total polyene mer incorporated in a 1,2-vinyl configuration.

Testing data in the Examples was performed on filled compositions made according to the formulations shown in Tables 1a (a formulation employing only silica as a particulate filler) and 1b (a formulation employing only carbon black as a particulate filler). In these tables, N-phenyl-N'-(1,3-dimethylbutyl)-p-phenyldiamine acts as an antioxidant while 2,2'-dithiobisbenzothiazole, N-t-butylbenzothiazole-2-sulfenamide, and N,N'-diphenylguanidine act as accelerators. These formulations are used to permit evaluation of functionalized polymers with specific particulate fillers, but this should not be considered limiting because mixtures of carbon black and silica, as well as the presence of additional types of particulate fillers, are envisioned.

TABLE 1a

Composition for vulcanizates, silica filler

|  | Amount (phr) |
|---|---|
| Masterbatch |  |
| synthesized polymer | 80 |
| poly(isoprene) (natural rubber) | 20 |
| silica | 52.5 |
| wax | 2 |
| N-phenyl-N'-(1,3-dimethylbutyl)-p-phenyldiamine | 0.95 |
| stearic acid | 2 |
| processing oil (low PCA content) | 10 |
| Re-mill |  |
| silica | 2.5 |
| silane | 5 |
| Final |  |
| sulfur | 1.5 |
| ZnO | 2.5 |
| 2,2'-dithiobisbenzothiazole | 2.0 |
| N-t-butylbenzothiazole-2-sulfenamide | 0.7 |
| N,N'-diphenylguanidine | 0.2 |
| TOTAL | 183.05 |

TABLE 1b

Composition for vulcanizates, carbon black filler

|  | Amount (phr) |
|---|---|
| Masterbatch |  |
| synthesized polymer | 100 |
| carbon black (N343 type) | 50 |
| wax | 2 |
| N-phenyl-N'-(1,3-dimethylbutyl)-p-phenyldiamine | 0.95 |
| stearic acid | 2 |
| processing oil (low PCA content) | 10 |
| Final |  |
| sulfur | 1.5 |
| ZnO | 2.5 |
| 2,2'-dithiobisbenzothiazole | 0.5 |
| N-t-butylbenzothiazole-2-sulfenamide | 0.5 |
| N,N'-diphenylguanidine | 0.3 |
| TOTAL | 170.25 |

Data corresponding to "Bound rubber" were determined using a procedure based on that described by J. J. Brennan et al., *Rubber Chem. and Tech.*, 40, 817 (1967).

Molecular weight data were determined via GPC, as described above.

Gum and compound Mooney viscosity ($ML_{1+4}$) values were determined with an Alpha Technologies™ Mooney viscometer (large rotor) using a one-minute warm-up time and a 4-minute running time; $t_{80}$ is the time (in sec, beginning at the point that disk of the viscometer is stopped) necessary for 80% of the Mooney viscosity to decay; tensile mechanical properties were determined using the standard procedure described in ASTM-D412; hysteresis (tan δ) data were obtained from dynamic experiments conducted at 60° C. and 10 Hz (strain sweep).

Examples 1-4: Control Polymerizations, n-Butyllithium

To a $N_2$-purged reactor equipped with a stirrer was added 1.68 kg hexane, 0.45 kg styrene solution, and 2.81 kg butadiene solution (21.3% in hexane). The reactor was charged with 3.9 mL n-BuLi solution, followed by 1.2 mL 2,2-bis(2'-tetrahydrofuryl)propane solution. The reactor jacket was heated to 50° C. and, after ~30 minutes, the batch temperature peaked at ~63° C.

After an additional ~30 minutes, portions of the polymer cement were transferred to four glass bottles. To one of the bottles (designated sample 1 below) was added isopropanol so as to quench the living polymer while, to the other bottles, were added
- sample 2—0.5 mL MA2E solution,
- sample 3—0.17 mL AP3E, and
- sample 4—0.11 mL GLYMO.

Each bottle was placed in a 50° C. water bath. After ~30 minutes, the bottles were removed, and the contents of each were separately coagulated in isopropanol containing BHT before being drum dried.

Certain properties of these polymers are summarized below in Table 2.

Examples 5-8: Comparative Polymerizations, Lithiated Piperidine

The procedure from Examples 1-4 was essentially repeated with the following exception: rather than adding the n-BuLi and 2,2-bis(2'-tetrahydrofuryl)propane solutions directly to the polymerization vessel, they were added sequentially to a bottle containing 5.9 mL piperidine solution (1.0 M in hexane), and then the contents of that bottle were added to the polymerization vessel. This time, the batch temperature peaked at ~65° C. after ~32 minutes.

After an additional ~30 minutes, portions of the polymer cement were transferred to four glass bottles. To one of the bottles (designated sample 5 below) was added isopropanol so as to quench the living polymer while, to the other bottles, were added
- sample 6—0.5 mL MA2E solution,
- sample 7—0.17 mL AP3E, and
- sample 8—0.12 mL ECH3M.

Further processing was the same as that set forth in Examples 1-4. Certain properties of these polymers are summarized below in Table 2.

Examples 9-12: Comparative Polymerizations, Lithiated HMI

To a mixture of 10 mL cyclohexane and 1.97 mL HMI solution was added 3.9 mL n-BuLi solution.

The lithiated HMI solution was added to a $N_2$-purged reactor equipped with a stirrer that contained 1.61 kg hexane, 0.45 kg styrene solution, and 2.88 kg butadiene solution (20.8% in hexane). Addition of the functional initiator was followed by addition of 1.2 mL 2,2-bis(2'-tetrahydrofuryl)propane solution. The reactor jacket was heated to 50° C. and, after ~30 minutes, the batch temperature peaked at ~67° C.

After an additional ~30 minutes, portions of the polymer cement were transferred to four glass bottles. To one of the bottles (designated sample 9 below) was added isopropanol so as to quench the living polymer while, to the other bottles, were added
- sample 10—0.5 mL MA2E solution,
- sample 11—0.17 mL AP3E, and
- sample 12—0.5 mL $SnCl_4$ solution.

Further processing was the same as that set forth in Examples 1-4. Certain properties of these polymers are summarized below in Table 2.

Examples 13-16: Functionalized Initiator, Adduct of Styrene and Lithiated HMI To a mixture of 10 mL cyclohexane and 1.97 mL HMI solution (3.0 M in cyclohexane) was added 3.9 mL n-BuLi solution and 0.4 mL 2,2-bis(2'-tetrahydrofuryl)propane solution, which then was allowed to stir for ~5 minutes before 8 mL styrene solution and another 0.8 mL 2,2-bis(2'-tetrahydrofuryl)propane solution were added. The contents were allowed to stir at room temperature for an additional ~30 minutes.

The functional initiator solution was added to a $N_2$-purged reactor equipped with a stirrer that contained 1.61 kg hexane, 0.45 kg styrene solution, and 2.88 kg butadiene solution (20.8% in hexane). The reactor jacket was heated to 50° C. and, after ~32 minutes, the batch temperature peaked at ~66° C.

After an additional ~30 minutes, portions of the polymer cement were transferred to four glass bottles. To one of the bottles (designated sample 13 below) was added isopropanol so as to quench the living polymer while, to the other bottles, were added
- sample 14—0.5 mL MA2E solution,
- sample 15—0.17 mL AP3E, and
- sample 16—0.5 mL $SnCl_4$ solution.

Further processing was the same as that set forth in Examples 1-4. Certain properties of these polymers are tabulated below.

TABLE 2

Polymer properties (low styrene, high vinyl)

| | $M_n$ (kg/mol) | $M_p$ (kg/mol) | $M_w/M_n$ | % coupling | $T_g$ (° C.) | $ML_{1+4}$ @ 100° C. | $t_{80}$ (sec) |
|---|---|---|---|---|---|---|---|
| sample 1 | 116 | 121 | 1.04 | 0.89 | −36.3 | 14.8 | 0.97 |
| sample 2 | 114 | 121 | 1.05 | 0.61 | −36.0 | 14.7 | 0.97 |
| sample 3 | 158 | 122 | 1.36 | 46.88 | −36.1 | 45.6 | 1.66 |
| sample 4 | 134 | 122 | 1.26 | 24.13 | −36.7 | 27.3 | 1.20 |
| sample 5 | 101 | 107 | 1.06 | 1.72 | −38.4 | 14.1 | 0.98 |
| sample 6 | 101 | 107 | 1.06 | 1.46 | −38.5 | 14.1 | 0.92 |
| sample 7 | 92 | 107 | 1.27 | 22.22 | −38.1 | 19.5 | 1.08 |
| sample 8 | 114 | 107 | 1.20 | 21.52 | −38.6 | 25.4 | 1.20 |

TABLE 2-continued

| | Polymer properties (low styrene, high vinyl) | | | | | | |
|---|---|---|---|---|---|---|---|
| | $M_n$ (kg/mol) | $M_p$ (kg/mol) | $M_w/M_n$ | % coupling | $T_g$ (° C.) | $ML_{1+4}$ @ 100° C. | $t_{80}$ (sec) |
| sample 9 | 103 | 109 | 1.06 | 1.92 | −37.5 | 15.4 | 0.96 |
| sample 10 | 103 | 109 | 1.05 | 1.42 | −39.3 | 20.5 | 1.09 |
| sample 11 | 45 | 108 | 2.35 | 28.28 | −39.5 | 23.7 | 1.08 |
| sample 12 | 189 | 376 | 1.66 | 80.07 | −39.8 | 76.5 | 3.89 |
| sample 13 | 113 | 119 | 1.06 | 2.20 | −37.0 | 21.3 | 0.99 |
| sample 14 | 111 | 118 | 1.06 | 0.95 | −37.7 | 25.0 | 1.11 |
| sample 15 | 71 | 118 | 1.72 | 20.53 | −37.2 | 25.6 | 1.07 |
| sample 16 | 224 | 402 | 1.47 | 74.43 | −37.4 | 72.4 | 3.11 |

Examples 17-19: Functionalized Initiator, Adduct of Styrene and Lithiated Piperidine To 5.9 mL piperidine solution (1.0 M in hexane) was added 3.9 mL n-BuLi solution and 0.3 mL 2,2-bis(2'-tetrahydrofuryl)propane solution, which then was allowed to stir for ~5 minutes before 8 mL styrene solution was added. The contents were allowed to stir at room temperature for an additional ~30 minutes.

The functional initiator solution was added to a $N_2$-purged reactor equipped with a stirrer that contained 1.88 kg hexane, 0.76 kg styrene solution, and 2.30 kg butadiene solution (20.8% in hexane). The reactor was charged with 0.5 mL KTA solution. The reactor jacket was heated to 65° C. and, after ~26 minutes, the batch temperature peaked at ~79° C.

After an additional ~30 minutes, portions of the polymer cement were transferred to four glass bottles. To one of the bottles (designated sample 17 below) was added isopropanol so as to quench the living polymer while, to the other bottles, were added sample 18—0.17 mL AP3E, and
sample 19—0.5 mL SnCl₄ solution.

Further processing was the same as that set forth in Examples 1-4. Certain properties of these polymers are summarized below in Table 3.

Examples 20-23: Functionalized Initiator, Adduct of Styrene and Lithiated 4-Piperidinopiperidine To 9.9 mL 4-piperidinopiperidine solution (0.6 M in cyclohexane) was added 3.9 mL n-BuLi solution and 0.3 mL 2,2-bis(2'-tetrahydrofuryl)propane solution, which then was allowed to stir for ~5 minutes before 8 mL styrene solution was added. The contents were allowed to stir at room temperature for an additional ~30 minutes.

This functional initiator then was used in a polymerization similar to that described in Examples 17-19. The batch temperature peaked at ~78° C. after ~26 minutes.

After an additional ~30 minutes, portions of the polymer cement were transferred to four glass bottles. To one of the bottles (designated sample 20 below) was added isopropanol so as to quench the living polymer while, to the other bottles, were added sample 21—0.5 mL MA2E solution,
sample 22—0.17 mL AP3E, and
sample 23—0.5 mL SnCl₄ solution.

Further processing was the same as that set forth in Examples 1-4. Certain properties of these polymers are summarized below in Table 3.

TABLE 3

| | Polymer properties (high styrene, low vinyl) | | | | | | |
|---|---|---|---|---|---|---|---|
| | $M_n$ (kg/mol) | $M_p$ (kg/mol) | $M_w/M_n$ | % coupling | $T_g$ (° C.) | $ML_{1+4}$ @ 100° C. | $t_{80}$ (sec) |
| sample 17 | 84 | 93 | 1.10 | 0 | −38.6 | 15.1 | 1.02 |
| sample 18 | 75 | 92 | 1.33 | 12.17 | −37.9 | 24.2 | 1.35 |
| sample 19 | 176 | 311 | 1.91 | 73.65 | −39.1 | 96.9 | 17.04 |
| sample 20 | 99 | 118 | 1.19 | 0 | −40.0 | 26.5 | 1.21 |
| sample 21 | 100 | 118 | 1.20 | 0 | −40.2 | 28.5 | 1.22 |
| sample 22 | 99 | 117 | 1.26 | * | −40.0 | 32.7 | 1.46 |
| sample 23 | 171 | 375 | 2.01 | 62.21 | −39.6 | 115.3 | — |

* Not discernible as a result of low molecular weight peaks resulting from polymer interaction with the GPC column.

Examples 24-47: Vulcanizates

Using the formulations from Table 1a and Table 1b above, vulcanizable elastomeric compounds containing reinforcing fillers were prepared from samples 1-4 and 9-16. Compounds were cured for ~900 seconds at 171° C. to provide vulcanizates 25-48.

Results of physical testing on vulcanizates made from these polymers are summarized below in Tables 4a-4c.

TABLE 4a

Compound and vulcanizate properties, control polymers

|  | 24 | 25 | 26 | 27 | 28 | 29 | 30 | 31 |
|---|---|---|---|---|---|---|---|---|
| synthetic polymer (sample no.) | 1 | 2 | 3 | 4 | 1 | 2 | 3 | 4 |
| compound formulation (Table no.) | 1a | 1a | 1a | 1a | 1b | 1b | 1b | 1b |
| Bound rubber (%) | 14.1 | 78.5 | 67.8 | 37.2 | 10.3 | 34.1 | 26.5 | 24.2 |
| $ML_{1+4}$ @ 130° C. (final) | 19.6 | 61.0 | 49.8 | 47.5 | 22.8 | 45.9 | 70.4 | 65.0 |
| Strain sweep (60° C., 10 Hz, final) |  |  |  |  |  |  |  |  |
| tan δ | 0.1616 | 0.0739 | 0.0728 | 0.0679 | 0.2296 | 0.1079 | 0.1511 | 0.1549 |
| Δ tan δ | 0.0848 | 0.0210 | 0.0177 | 0.0141 | 0.1230 | 0.0221 | 0.0605 | 0.0621 |

TABLE 4b

Compound and vulcanizate properties, comparative polymers

|  | 32 | 33 | 34 | 35 | 36 | 37 | 38 | 39 |
|---|---|---|---|---|---|---|---|---|
| synthetic polymer (sample no.) | 9 | 10 | 11 | 12 | 9 | 10 | 11 | 12 |
| compound formulation (Table no.) | 1a | 1a | 1a | 1a | 1b | 1b | 1b | 1b |
| Bound rubber (%) | 15.2 | 67.4 | 67.2 | 25.5 | 26.2 | 45.8 | 67.1 | 44.8 |
| $ML_{1+4}$ @ 130° C. (final) | 21.0 | 58.1 | 56.6 | 48.1 | 33.2 | 65.8 | 122.0 | 66.0 |
| Strain sweep (60° C., 10 Hz, final) |  |  |  |  |  |  |  |  |
| tan δ | 0.1364 | 0.0654 | 0.0667 | 0.1085 | 0.1313 | 0.0971 | 0.1227 | 0.0916 |
| Δ tan δ | 0.0657 | 0.0179 | 0.0207 | 0.0489 | 0.0440 | 0.0257 | 0.0512 | 0.0249 |

TABLE 4c

Compound and vulcanizate properties

|  | 40 | 41 | 42 | 43 | 44 | 45 | 46 | 47 |
|---|---|---|---|---|---|---|---|---|
| synthetic polymer (sample no.) | 13 | 14 | 15 | 16 | 13 | 14 | 15 | 16 |
| compound formulation (Table no.) | 1a | 1a | 1a | 1a | 1b | 1b | 1b | 1b |
| Bound rubber (%) | 16.0 | 64.5 | 66.7 | 25.1 | 26.5 | 45.6 | 65.0 | 43.5 |
| $ML_{1+4}$ @ 130° C. (final) | 25.0 | 59.1 | 55.8 | 48.1 | 37.7 | 71.0 | 120.0 | 67.8 |
| Strain sweep (60° C., 10 Hz, final) |  |  |  |  |  |  |  |  |
| tan δ | 0.1276 | 0.0643 | 0.0698 | 0.1049 | 0.1231 | 0.1005 | 0.1193 | 0.0942 |
| Δ tan δ | 0.0614 | 0.0182 | 0.0245 | 0.0510 | 0.0388 | 0.0291 | 0.0482 | 0.0274 |

The data of Table 4c is generally comparable to or better than that of Table 4b (comparative), both of which are better than that of Table 4a (control).

Examples 48-51: Continuous Polymerizations

Each of these polymerizations was conducted in a 24.6 L reactor having a 1200 second residence time. Hexane was used as solvent, and the jacket temperature was set at 88° C.

For Example 48 (control SBR), the following ingredients were metered into the bottom of the reactor:

(1) ~0.8 g/sec styrene solution (31.8% in hexane),
(2) ~6.8 g/sec 1,3-butadiene solution (21.7% in hexane),
(3) ~2.4 g/sec hexane,
(4) ~0.11 g/sec 2,2-bis(2'-tetrahydrofuryl)propane solution (0.10 M in hexane),
(5) ~2×10$^{-9}$ m$^3$/sec 1,2-butadiene (20% in hexane), and
(6) ~0.097 g/sec n-BuLi solution (0.125 M in hexane).

An additional stream of ~2.94 g/sec 1,3-butadiene solution was added at the midpoint of the reactor to minimize formation of blocks of styrene mer. Polymer cement was removed to a storage vessel from the top of the reactor. After 4500±900 seconds of polymerization, the reactor reached a steady state, with the temperature at the top being ~99° C. and that at the bottom being ~91° C.

Example 49 (comparative SBR with functional termination) was conducted identically to that described in the preceding paragraph but with an additional stream of ~0.053 g/sec N-(1,3-dimethylbutylidene)-3-(triethoxysilyl)-1-propaneamine solution (0.075 M in hexane) being added near the exit of the reactor. The functionally terminated polymer cement also was given an additional 1200 seconds residence time in a second reactor vessel prior to being quenched.

Examples 50 and 51 were conducted substantially identically to, respectively, examples 49 and 50 with the following two exceptions: the 2,2-bis(2'-tetrahydrofuryl)propane solution (0.10 M in hexane) was added at ~0.10 g/sec and the alkyllithium initiator solution stream was replaced with a 0.11 g/sec stream of a 0.116 M functionalized initiator prepared by premixing HMI, styrene, 1,3-butadiene, 2,2-bis(2'-tetrahydrofuryl)propane and n-BuLi at a molar ratio of 0.85:2.0:1.0:0.77:1.0.

Certain properties of these polymers are summarized below in Table 5 (with the 1,2-vinyl configuration being a molar percentage relative to total butadiene mer).

TABLE 5

Polymer properties (continuous polymerization)

|  | 48 | 49 | 50 | 51 |
|---|---|---|---|---|
| conversion (%) | 99.7 | 99.7 | 98.7 | 98.7 |
| $M_n$ (kg/mol) | 94 | 79 | 100 | 80 |
| $M_w$ (kg/mol) | 215 | 246 | 225 | 256 |
| $T_g$ (° C.) | −56.1 | −51.9 | −55.7 | −51.9 |
| styrene mer (wt. %) | 11.7 | 11.6 | 12.1 | 11.6 |
| 1,2-vinyl mer (%) | 41.2 | 45.2 | 40.8 | 45.2 |
| $ML_{1+4}$ @ 100° C. | 31 | 37 | 33 | 44 |
| $t_{80}$ (sec) | 2.0 | 2.5 | 6.8 | 17.4 |

Examples 52-61: Polymerizations, Lithiated HMI and Adduct of Styrene and Lithiated HMI These examples compare the properties of polymers produced by a widely used functional initiator (lithiated HMI) and a styrene adduct employing lithiated HMI as a reactant. The polymers were targeted to have compositional and microstructure characteristics similar to those from Examples 17-23.

Three samples employed lithiated HMI as an initiator. One (designated Example 52 below) was quenched with isopropanol while the others were reacted with a terminal functionalizing agent: MA2E and AP3E, designated Examples 53 and 54 respectively below.

The remaining samples were prepared using an adduct of styrene and lithiated HMI as initiator. Examples 55-58 below used a 1:1 ratio of adduct and n-BuLi as initiator, while Examples 59-61 used a 1:2 ratio. Two of these samples (Examples 55 and 59) were quenched with isopropanol while the others were reacted with a functionalizing compound:

Examples 56—MA2E,
Examples 57 & 60—AP3E, and
Examples 58 & 61—ECH3M.

Further processing was the same as that set forth in Examples 1-4.

Using the formulation from Table 1a above, vulcanizable elastomeric compounds containing silica were prepared from these polymers. Compounds were cured and processed similarly to those described previously, and the results of physical testing on the resulting vulcanizates are summarized below in Table 6.

TABLE 6

Vulcanizate properties

|  | Bound rubber | $ML_{1+4}$ @ 130° C. (final) | Strain sweep (60° C., 10 Hz, final) | |
|---|---|---|---|---|
|  |  |  | tan δ | Δ tan δ |
| 52 | 18.04 | 19.4 | 0.1891 | 0.0941 |
| 53 | 67.06 | 55.0 | 0.1040 | 0.0297 |
| 54 | 63.99 | 48.2 | 0.1061 | 0.0309 |
| 55 | 14.22 | 25.2 | 0.1495 | 0.0656 |
| 56 | 51.02 | 60.5 | 0.0902 | 0.0232 |
| 57 | 52.58 | 52.8 | 0.0920 | 0.0242 |
| 58 | 70.31 | 47.5 | 0.0745 | 0.0070 |
| 59 | 15.21 | 17.9 | 0.1659 | 0.0787 |
| 60 | 66.33 | 48.0 | 0.0945 | 0.0169 |
| 61 | 69.93 | 51.7 | 0.0849 | 0.0083 |

In this table, the comparative examples with their respective inventive counterparts are as follows:

Example 52—Examples 55 & 59
Example 53—Example 56
Example 54—Examples 57 & 60
(Examples 58 and 61 do not have comparatives.)

Plots of tan δ vs. Mooney viscosity and Δ tan δ vs. tan δ visually depict the advantages gained from terminal functionalization generally as well as from using an inventive adduct over a traditional functional initiator.

That which is claimed is:

1. A process for providing a polymer that comprises ethylenic unsaturation, comprising:
    a) providing an initiating compound having the general formula

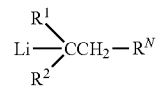

where
R¹ is a substituted or unsubstituted phenyl group,
R² is R¹, a hydrogen atom, a substituted or unsubstituted alkyl group, or a substituted or unsubstituted cycloalkyl group, and
$R^N$ is the radical of a secondary amine group,
with the proviso that each of R¹ and R² is free of active hydrogen atom-containing groups;
    b) introducing said initiating compound to a reaction vessel that comprises one or more organic liquids and one or more ethylenically unsaturated compounds which comprise at least one polyene;
    c) allowing said one or more ethylenically unsaturated compounds to polymerize, thereby providing said polymer; and
    d) optionally, while said polymer is in carbanionic form, allowing it to react with a terminating compound, coupling agent or linking agent so as to provide terminal functionality to said polymer.

2. The process of claim 1 wherein said at least one polyene comprises one or more conjugated dienes.

3. The process of claim 2 wherein said one or more ethylenically unsaturated compounds further comprises at least one vinyl aromatic compound.

4. The process of claim 1 wherein each of said at least one polyene is a conjugated diene.

5. The process of claim 4 wherein said one or more ethylenically unsaturated compounds further comprises at least one vinyl aromatic compound.

6. The process of claim 1 wherein said one or more organic liquids comprise at least one $C_5$-$C_{12}$ acyclic alkane.

7. The process of claim 6 wherein said one or more organic liquids is at least one $C_5$-$C_{12}$ acyclic alkane.

8. The process of claim 1 wherein said initiating compound is the reaction product of a lithiated secondary amine and a vinyl aromatic compound having the general formula

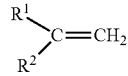

where R¹ is a substituted or unsubstituted phenyl group and R² is a hydrogen atom, a substituted or unsubstituted alkyl group, a substituted or unsubstituted cycloalkyl group or R¹, with the proviso that each of R¹ and R² is free of active hydrogen atom-containing groups.

9. The process of claim 8 wherein the N atom of said secondary amine is bonded to two hydrocarbyl groups.

10. The process of claim 9 wherein each of said hydrocarbyl groups is an alkyl group.

11. The process of claim 8 wherein the N atom of said secondary amine is part of a cyclic group having 5 to 8 ring atoms.

12. The process of claim 11 wherein at least one ring atom of said cyclic group having 5 to 8 ring atoms comprises at least one substituent.

13. The process of claim 12 wherein said at least one substituent comprises a tertiary amine group.

14. The process of claim 13 wherein said tertiary amine group is part of a cyclic group having 5 to 8 ring atoms.

15. The process of claim 14 wherein said secondary amine is 4-piperidinopiperidine.

16. The process of claim 8 wherein $R^1$ is a substituted phenyl group.

17. The process of claim 16 wherein at least one substituent of said substituted phenyl group comprises at least one P, O or Si atom.

18. The process of claim 1 further comprising recovering and isolating said polymer.

19. The process of claim 18 further comprising blending said polymer with ingredients that comprise at least one particulate filler so as to provide a rubber compound.

20. The process of claim 19 further comprising vulcanizing said rubber compound so as to provide a vulcanizate, said vulcanizate optionally being a tire component.

* * * * *